UNITED STATES PATENT OFFICE.

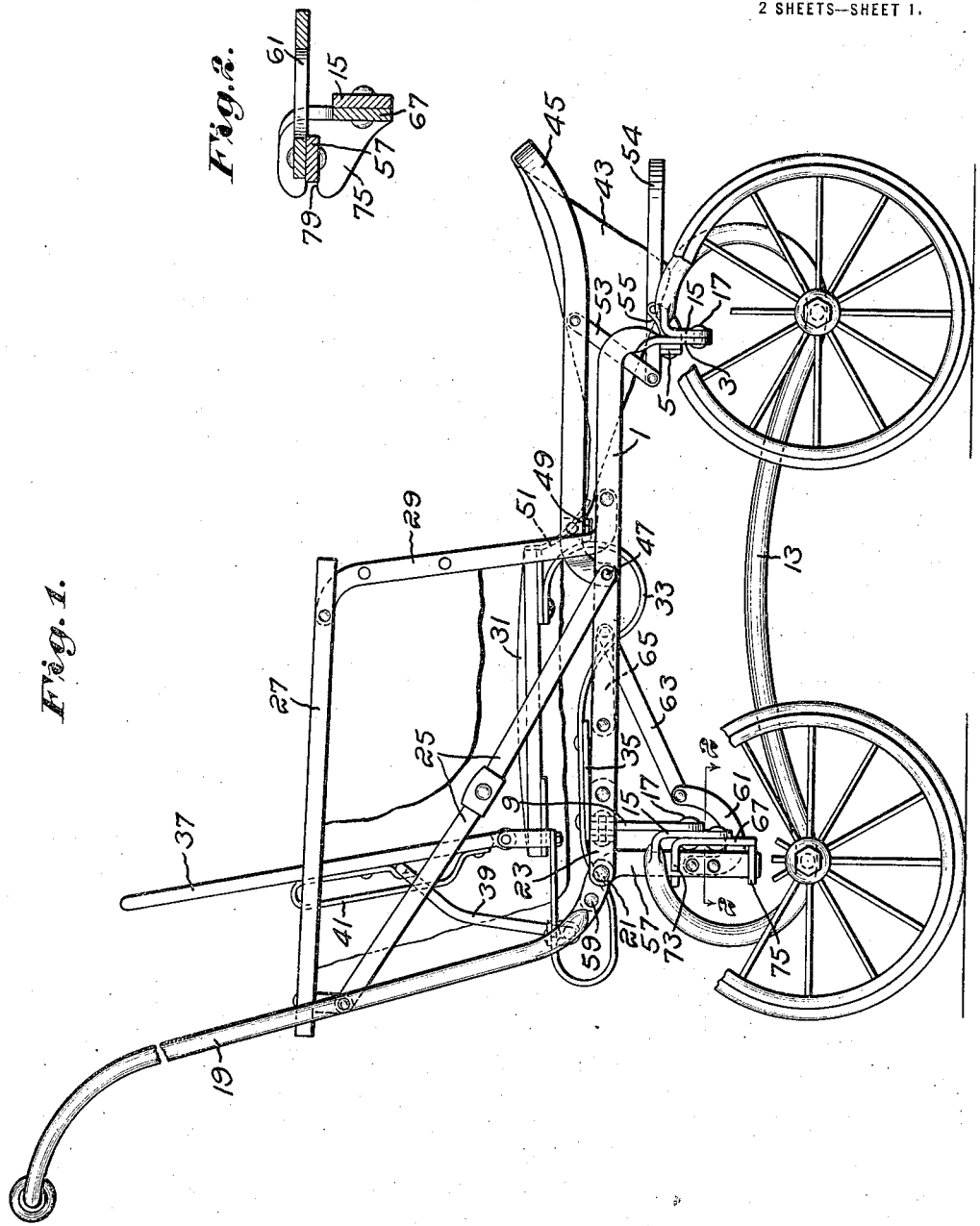

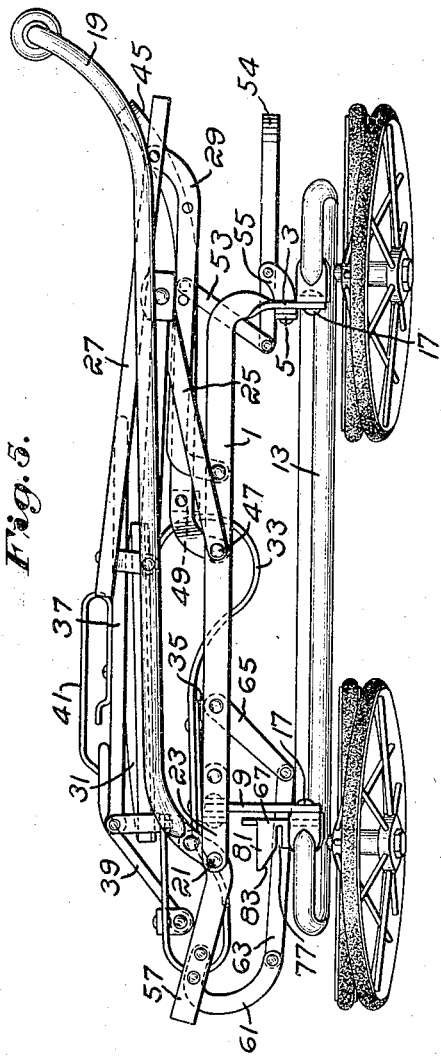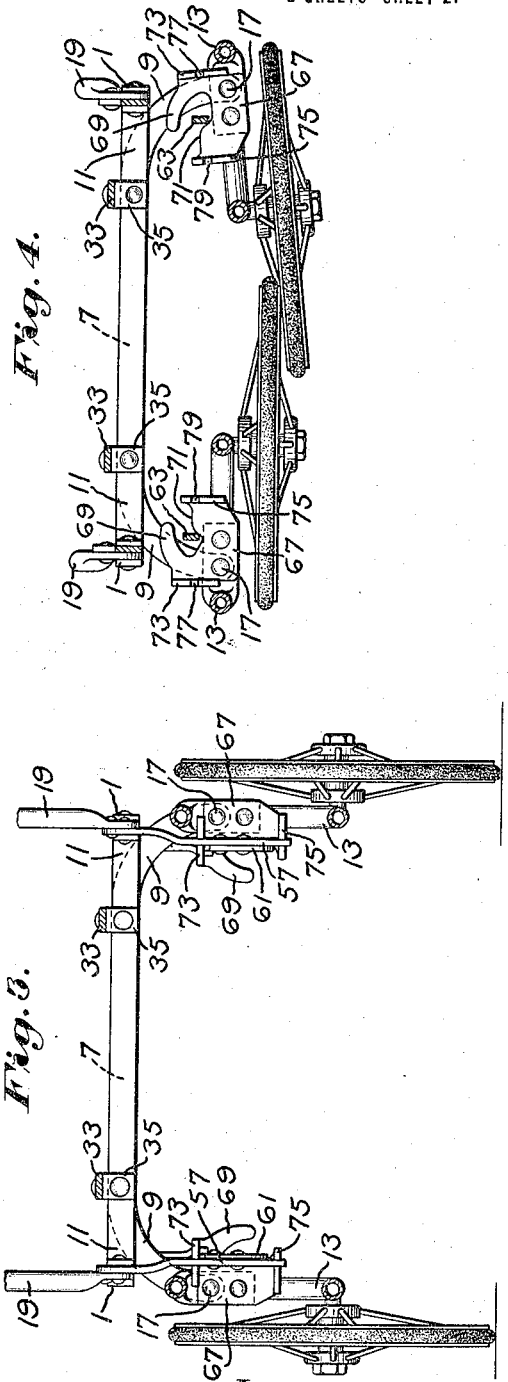

GEORGE B. AMBLER, OF LEOMINSTER, MASSACHUSETTS, ASSIGNOR TO F. A. WHITNEY CARRIAGE COMPANY, OF LEOMINSTER, MASSACHUSETTS, A CORPORATION OF MASSACHUSETTS.

COLLAPSIBLE VEHICLE.

1,242,634.  Specification of Letters Patent.  Patented Oct. 9, 1917.

Application filed January 25, 1916. Serial No. 74,264.

*To all whom it may concern:*

Be it known that I, GEORGE B. AMBLER, a citizen of the United States, and a resident of Leominster, Massachusetts, have invented an Improvement in Collapsible Vehicles, of which the following description, in connection with the accompanying drawings, is a specification, like characters on the drawings representing like parts.

This invention relates to children's vehicles and among other objects provides strong and simple means for folding and erecting the wheel carriers and securely locking the same in erect position. The invention is an improvement upon the construction disclosed in my Patent 1,215,303, dated Feb. 6, 1917.

The character of the invention may be best understood by reference to the following description of a selected embodiment illustrating the invention shown in the accompanying drawings, wherein,—

Figure 1 is a side elevation of a vehicle illustrating the invention;

Fig. 2 on an enlarged scale is a detail section taken on line 2—2 of Fig. 1;

Fig. 3 is a rear elevation of the running gear of the vehicle showing the wheel carriers in erect position;

Fig. 4 is a view similar to Fig. 3 showing the wheel carriers in collapsed position; and Fig. 5 is a side elevation of the vehicle as a whole in collapsed position.

Referring to the drawings, the vehicle illustrating the invention shown therein comprises a main frame including longitudinal side members 1 having forward depending end brackets 3 connected by a transverse member 5 riveted thereto. A transverse, bail-like member 7 is provided adjacent the rear ends of said side members and has downwardly curved ends forming brackets 9. Said transverse member is connected to said side members by opposed angle brackets 11 riveted thereto.

The frame is mounted on wheel carriers 13 conveniently of tubular material arched upward centrally thereof and having portions curved upward and inward and depending flattened terminals 15 overlapping the front and rear brackets 3 and 9 and pivotally connected thereto by rivets 17. The wheel carriers may swing transversely of the vehicle outward to erect positions as shown in Figs. 1 and 3, or they may swing inward into overlapped, collapsed relation as shown in Figs. 4 and 5.

Handle bars 19 are pivotally connected by rivets 21 with ends 23 of the side members 1 projecting rearward slightly beyond the transverse frame member 7. The handle bars are adapted to swing from their position shown in Fig. 1 to their folded position substantially parallel with the main frame as shown in Fig. 5. To hold the handle bars in erected position, toggle links 25 are pivotally connected thereto and to the side members 1 of the main frame. When straightened they will securely hold the handle bars in erected position and when buckled they will readily permit the folding of the bars to their collapsed position.

Side arms 27 are pivotally connected to said handle bars and to upright levers 29 pivotally connected to the side members 1. The side arms and upright members may fold toward the main frame when the handle bars are folded as described.

A seat 31 is fastened to springs 33 mounted on brackets 35 secured to the transverse frame member 7 referred to. A back 37 may be pivotally connected to the rear end of the seat and be supported by a brace 39 coöperating with a loop bar 41 fastened to the rear face of said back.

A foot well 43 may be provided having its front end fastened to an upwardly curved bail 45 pivotally connected by rivets 47 with the side members 1 of the frame. The rear end of the foot well may be secured to a transverse bar 49 secured to said bail adjacent the pivoted ends thereof. A flap 51 may be secured to the front edge of the seat and depend downward and overlap the rear end of the foot well to cover the space between the seat and the foot well. It will be observed the foot well and its bail are separate from the seat and permit the latter to move upward and downward without affecting the seat. The foot well may be supported at different elevations by links 53 pivotally connected to said bail and to an operating bail 54 fulcrumed adjacent its ends on short arms 55 fastened to the front brackets 3 referred to.

In my said co-pending application the wheel carriers were folded transversely of the frame to erected and collapsed positions by movement of the handle bars through the side arms and upright levers connecting the latter with the side members of the frame. In accordance with my present invention the folding of the wheel carriers is accomplished directly by the handle bars. To this end said bars are provided with extension terminals 57 depending downward from the points of pivotal connection of the handle bars with the side members of the frame. These extension terminals may be integral with said handle bars or they may be separate pieces rigidly attached to said bars. Herein they are shown in the latter form and are secured rigidly to said handle bars by rivets 59 and the pivot rivets 21 referred to for the handle bars. The extension terminals 57 have arms 61 curved upward and forward therefrom. These arms may be integral with said terminals or may be in the form of separate pieces riveted thereto as shown. The front ends of said arms are connected by links 63 with arms 65 pivotally connected to the frame side members 1, the links 63 suspended from the frame or arm by the link 65 serving as wiper bars as hereinafter described. Plates 67 may be riveted or otherwise secured to the rear terminals 15 of the wheel carriers and have tappet fingers 69 projecting inward therefrom over the curved arms 61 referred to when the carriers are erected. When the handle bars are rocked forward their extensions 57 will be rocked upward in a clockwise direction (Fig. 1) about the pivot points 21 for the handles, and the links 63 will retreat to and beneath the tappet fingers 69. In the course of the folding of the handle bars, said links will move upward toward the main frame side members 1 and engage said tappet fingers and fold said wheel carriers on their pivot rivets 17 into overlapped, collapsed position as shown in Figs. 4 and 5. One of the tappet fingers is disposed to be engaged by its link shortly in advance of the engagement of the other tappet finger by its link. Consequently the wheel carrier at one side of the vehicle receives its initial folding movement shortly before the carrier at the opposite side of the vehicle, thereby preventing interference with their folding movements.

To erect the wheel carriers the links 63 are adapted to engage and wipe downward along inner edges 71 (Fig. 4) on the plates 67, thereby causing the carriers to rock from their collapsed position to their erected position as shown in Figs. 1 and 3.

The folding and erecting movements of the wheel carriers are accomplished by an extremely simple, compact construction located inconspicuously adjacent the rear of the vehicle. The necessity for connection of the side arms 27 and upright levers 29 with the folding and erecting mechanism is eliminated.

Next will be described simple and effective means for locking the wheel carriers in their erected position. To accomplish this each of the plates 67 is provided with upper and lower rearwardly projecting lugs 73 and 75 containing registering open slots or notches 77 and 79. When the handle bar extensions 57 are rocked in a contra-clockwise direction on erection of the wheel carriers, said extensions will enter the registering slots in said lugs. Each upper lug 73 may have a cam projection 81 provided with an inner inclined edge 83 (Fig. 5) leading to its slot 77. The handle bar extensions may engage and wipe along said edges and thereby assist or effect the final erecting movement of the wheel carriers.

Each upper lug 73 may be located above, and each lower lug 75 may be located beneath, the pivotal rivet 17 of the wheel carrier. Consequently when the extensions enter the slots in said lugs they will engage and securely lock the wheel carrier above and beneath its fulcrum point and positively prevent the rocking of the wheel carrier into collapsed position. The extensions being in the form of prolongations of the handle bars, constitute an extremely simple, strong means for locking the carriers in their erected position. When the wheel carriers are erected the extensions project downward along said carriers where they are inconspicuous. It is unnecessary to connect said extensions by a transverse bracing member since they have sufficient inherent strength and rigidity as extensions of the handle bars to hold the carriers in erected position. The downwardly curved rear brackets 9 constructed as described present a very strong, rigid construction and since the wheel carriers when erected are rigidly locked to these brackets by the handle bar extensions, said wheel carriers are rigidly supported in erected position.

Having described one illustrative embodiment of the invention without limiting the same thereto, what I claim as new and desire to secure by Letters Patent is:—

1. A vehicle comprising in combination, a frame, wheel carriers pivotally connected thereto foldable transversely of the vehicle to collapsed and erect positions, handle bars pivotally connected to said frame having extensions rigid therewith projecting beneath said frame, and lugs on the wheel carriers having notches to receive the extensions adjacent thereto.

2. A vehicle comprising in combination, a frame, wheel carriers pivotally connected thereto foldable transversely of the vehicle to collapsed and erect positions, handle bars pivotally connected to said frame having extensions rigid therewith projecting beneath said frame, and spaced lugs on each wheel carrier having notches to receive the extension adjacent thereto and engage the same at separate points.

3. A vehicle comprising in combination, a frame, wheel carriers foldable transversely thereof to collapsed and erect positions, lugs on each wheel carrier having notches therein, and handle bars pivotally connected to said frame having extensions rigid therewith for entrance into said notches to lock the carriers in erected position, some of said lugs having cam projections coöperating with said extensions to assist the erection of said carriers.

4. A vehicle comprising in combination, a frame, wheel carriers foldable transversely thereof to collapsed and erect positions, tappet fingers projecting from said wheel carriers, handle bars pivotally connected to said frame having extensions rigid therewith, and members pivotally connected to said extensions for engagement with said tappet fingers to fold said carriers to collapsed position in the course of the folding of said handle bars.

5. A vehicle comprising in combination, a frame, wheel carriers foldable transversely thereof to erect and collapsed positions, handle bars pivotally connected to said frame having extensions rigid therewith, and members pivotally connected to said extensions for rocking said carriers to erect position on the folding of said handle bars to erect position.

6. A vehicle comprising in combination, a frame, wheel carriers foldable transversely thereof to erect and collapsed positions, handle bars pivotally connected to said frame having rigid extensions, arms pivotally connected to said frame, links pivotally connected to said arms and extensions, and means on said wheel carriers coöperating with said links for folding said carriers to their collapsed position.

7. A vehicle comprising in combination, a frame including side members 1, wheel carriers 13 foldable transversely of said frame to collapsed and erected positions, handle bars 19 pivotally connected to said frame and having rigid extensions 57 projecting beyond the points of pivotal connections of said bars with said frame, and notched lugs 73 and 75 on said wheel carriers coöperating with said extensions to lock said carriers in erected position.

8. A vehicle comprising in combination, a frame, wheel carriers foldable transversely thereof to erect and collapsed positions, handle bars pivotally attached to said frame and having rigid extensions, longitudinal wiper bars connected to said extensions and means on said carriers coöperating with said bars in their movement to actuate the carriers.

9. A vehicle comprising in combination, a frame, wheel carriers foldable transversely thereof to erect and collapsed positions, handle bars pivotally attached to said frame and having rigid extensions, longitudinal wiper bars connected to said extensions and mounted for longitudinal and vertical movements when the handle bars are swung and means on said carriers coöperating with said bars in their movement to actuate the carriers.

10. A vehicle comprising in combination, a frame, wheel carriers foldable transversely thereof to erect and collapsed positions, handle bars pivotally attached to said frame and having rigid extensions, links pivoted to said extensions and having other ends suspended by links from said frame and means on said carriers coöperating with said first links in their movement to actuate the carriers.

11. A vehicle comprising in combination, a frame, wheel carriers foldable transversely thereof to erect and collapsed positions, handle bars pivotally attached to said frame and having rigid extensions, longitudinal wiper bars connected to said extensions, means on said carriers coöperating with said bars in their movement to actuate the carriers and means associated with said extensions to lock the carriers in erected position.

In testimony whereof, I have signed my name to this specification, in the presence of two subscribing witnesses.

GEORGE B. AMBLER.

Witnesses:
 HERBERT G. FRAZEE,
 EDWARD J. MERRICK.

Copies of this patent may be obtained for five cents each, by addressing the "Commissioner of Patents, Washington, D. C."